US012204357B2

(12) United States Patent
Wang

(10) Patent No.: US 12,204,357 B2
(45) Date of Patent: Jan. 21, 2025

(54) LOW DROP-OUT CIRCUIT, ELECTRONIC DEVICE, AND METHOD OF MANUFACTURING THE SAME

(71) Applicant: TAIWAN SEMICONDUCTOR MANUFACTURING COMPANY LTD., Hsinchu (TW)

(72) Inventor: Yi-Hsiang Wang, New Taipei (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 378 days.

(21) Appl. No.: 17/692,058

(22) Filed: Mar. 10, 2022

(65) Prior Publication Data

US 2023/0288947 A1 Sep. 14, 2023

(51) Int. Cl.
*G05F 1/575* (2006.01)

(52) U.S. Cl.
CPC .................................... *G05F 1/575* (2013.01)

(58) Field of Classification Search
CPC ........................................................ G05F 1/575
See application file for complete search history.

(56) References Cited

U.S. PATENT DOCUMENTS 10,591,938 B1 * 3/2020 Golara .................... G05F 1/575
2023/0221743 A1 * 7/2023 Lin ......................... G05F 1/575
323/273

OTHER PUBLICATIONS

Vladimir A. Ryzhkov, et al., "High-Voltage Low Drop Output Voltage Regulator with Output Current Fold-Back Protection in 250nm BCD Technology," IEEE International Micro/Nanotechnologies and Electron Devices (EDM), pp. 549-554, Jun. 2016.

* cited by examiner

*Primary Examiner* — Kyle J Moody
(74) *Attorney, Agent, or Firm* — WPAT LAW; Anthony King

(57) ABSTRACT

The present disclosure provides a low dropout (LDO) circuit. The LDO circuit includes an input terminal, an output terminal, a cascode operational amplifier, and a power stage. The cascode operational amplifier is electrically connected to the input terminal. The power stage has a first terminal electrically connected to the input terminal, a second terminal electrically connected to an output node of the cascode operational amplifier, and a third terminal electrically connected to the output terminal.

20 Claims, 7 Drawing Sheets

LOW DROP-OUT CIRCUIT, ELECTRONIC DEVICE, AND METHOD OF MANUFACTURING THE SAME

TECHNICAL FIELD

The disclosure relates to an electronic device, and a method of manufacturing an electronic device, and more particularly, to an electronic device including a low dropout (LDO) circuit.

BACKGROUND

LDO circuits are widely used for regulating output voltage. However, LDO circuits may have issues when employed in wide range input applications.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
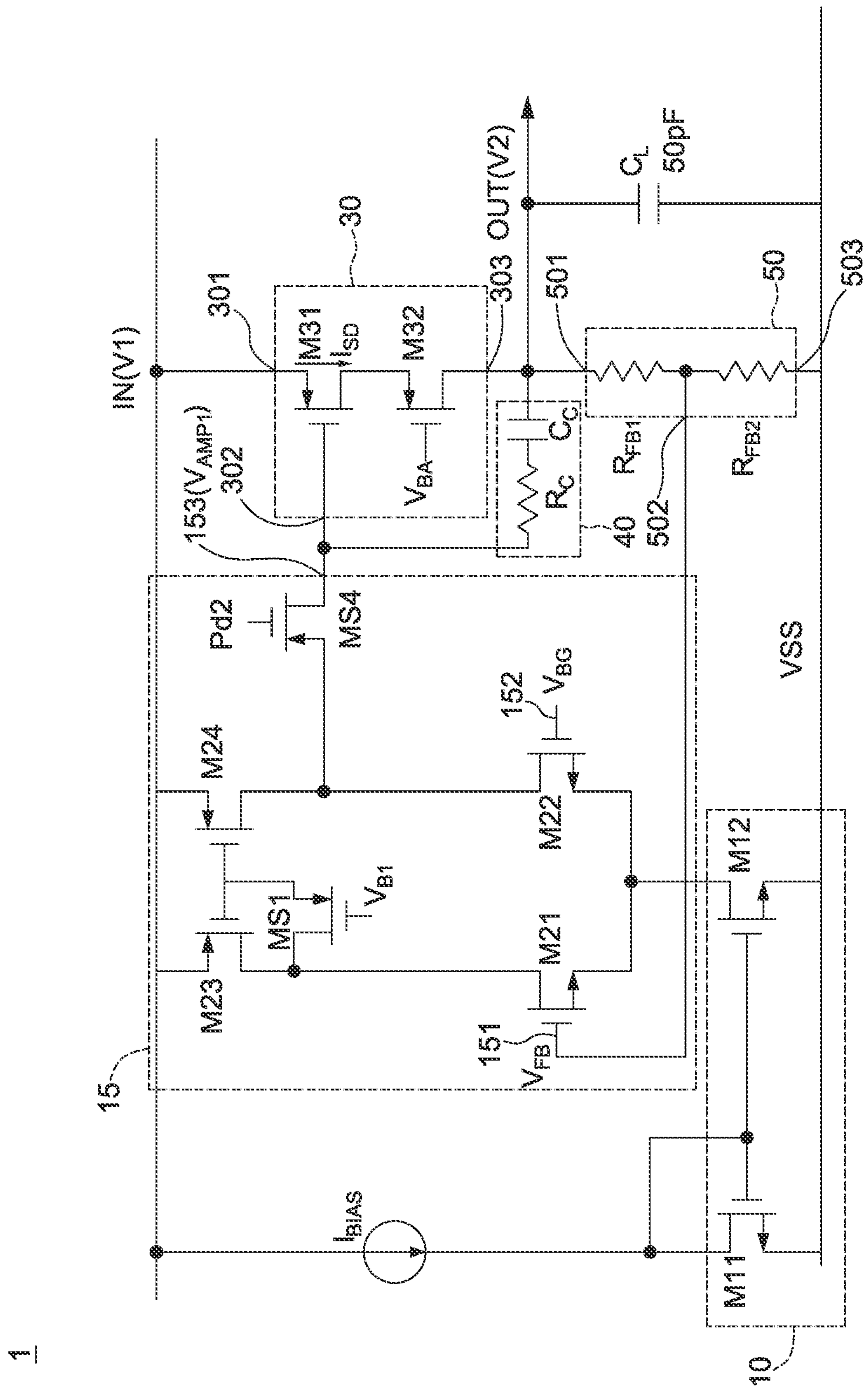
FIG. 1 is a schematic diagram of an electronic device in accordance with some embodiments of the present disclosure.

The following disclosure provides many different embodiments, or examples, for implementing different features of the provided subject matter. Specific examples of components and arrangements are as follows to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments, or examples, illustrated in the drawings are disclosed below using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, the following description should be understood to represent examples only, and are not intended to suggest that one or more steps or features is required.

In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram of an electronic device 1 in accordance with some embodiments of the present disclosure. The electronic device 1 may be referred to as a low dropout (LDO) circuit. The electronic device 1 includes a current mirror 10, an amplifier 15, a power stage 30, a compensation circuit 40, and a feedback circuit 50. The electronic device 1 may include an input terminal IN and an output terminal OUT. The electronic device 1 may be configured to receive a first voltage V1 (or an input voltage) at the input terminal IN. The electronic device 1 may be configured to provide a second voltage V2 (or an output voltage) at the output terminal OUT. The amplifier 15 is electrically connected to the input terminal IN. The power stage 30 is electrically connected to the input terminal IN. The power stage 30 is electrically connected to the output terminal OUT. In some embodiments, the electronic device 1 may include a load capacitor $C_L$. The power stage 30 is electrically connected to a load capacitor $C_L$. The compensation circuit 40 is electrically connected to the amplifier 15. The compensation circuit 40 is electrically connected to the power stage 30. The compensation circuit 40 is electrically connected to the feedback circuit 50. The feedback circuit 50 is electrically connected to the amplifier 15. The feedback circuit 50 is electrically connected to the power stage 30.

The current mirror 10 includes a transistor M11 and a transistor M12. The transistor M11 or M12 may include a MOS field-effect transistor (FET). The transistor M11 or M12 may include a p-type MOSFET or an n-type MOSFET. The exemplary transistor as shown in FIG. 1 for the transistor M11 or M12 will be an n-type MOSFET. The transistor M11 has a source electrically connected to the ground VSS, a drain electrically connected to an independent bias current source $I_{BIAS}$, and a gate electrically connected to the drain of the transistor M11. The transistor M12 has a source electrically connected to the ground VSS, a drain electrically connected to the amplifier 15, and a gate electrically connected to the gate of the transistor M11.

The transistor M11 or M12 may include a short-channel transistor. The transistor M11 or M12 may include a transistor with a minimum-available channel length. The transistor M11 or M12 may include a FIN-FET. The transistor M11 or M12 may include a core transistor. The core transistor may be defined as a transistor manufactured in a core region of a semiconductor device. The core transistor may be defined as a transistor manufactured at a minimum-available dimension. For example, the gate length of the core transistor may be significantly smaller than an I/O transistor or a high-voltage transistor. The gate length of the core transistor may be, for example, less than or equal to, but is not limited to, around 65 nm, 45 nm, 28 nm, 20 nm, 14 nm, 10 nm, 7 nm, 5 nm, 3 nm, 1 nm or less.

The current mirror 10 is configured to receive a first constant current from the independent bias current source $I_{BIAS}$ and, in response to the first constant current, provide a second constant current to the amplifier 15. The first constant current may be the same as the second constant current. The independent bias current source $I_{BIAS}$ is electrically connected to the input terminal IN of the electronic device 1.

The amplifier 15 has a first input node 151 and a second input node 152, and an output node 153. The amplifier 15 may be an operational amplifier (OPA). The amplifier 15 is configured to amplify the difference between the voltages received by the first input node 151 and the second input node 152 and provide a voltage at the output node 153 proportional thereto.

The amplifier 15 may include transistors M21, M22, M23, M24, MS1, and MS4. The transistors M21, M22, M23, M24, MS1, and MS4 may each include a MOS field-effect transistor (FET). The transistors M21, M22, M23, M24, MS1, and MS4 may each include a p-type MOSFET or an n-type MOSFET. The exemplary transistor as shown in FIG. 1 for the transistor M21 or M22 will be an n-type MOSFET. The exemplary transistor as shown in FIG. 1 for the transistor M23, M24, MS1, or MS4 will be a p-type MOSFET.

The transistor M21 has a source electrically connected to the drain of the transistor M12 of the current mirror 10, a gate electrically connected to the first input node 151 of the amplifier 15, and a drain electrically connected to a drain of the transistor M23. The gate of the transistor M21 (or the first input node 152) is configured to receive a feedback voltage $V_{FB}$ from the feedback circuit 50.

The transistor M22 has a source electrically connected to the drain of the transistor M12 of the current mirror 10, a gate electrically connected to the second input node 152 of the amplifier 15, and a drain electrically connected to the output node 153 of the amplifier 15. The source of the transistor M21 and the source of the transistor M22 are electrically connected with each other. The gate of the transistor M22 (or the second input node 152) is configured to receive a reference voltage $V_{BG}$. The reference voltage $V_{BG}$ may be provided by a voltage reference circuit (or a bandgap circuit). The reference voltage $V_{BG}$ may be maintained within a predetermined range. The reference voltage $V_{BG}$ may be a desirable constant voltage.

In some embodiments, the transistors M21 and M22 may consist of a differential pair.

The transistor M23 has a source electrically connected to the input terminal IN of the electronic device 1, the drain electrically connected to the drain of the transistor M21, and a gate electrically connected to a gate of the transistor M24. The transistor M24 has a source electrically connected to the output terminal OUT of the electronic device 1, the drain electrically connected to the drain of the transistor M22, and the gate electrically connected to the gate of the transistor M24. In some embodiments, the input terminal IN may act as a power supply (e.g., AVDD) for the amplifier 15.

The transistor MS1 may be referred to as a switch transistor. The switch transistor MS1 has a source electrically connected to the gate of the transistor M23, a drain electrically connected to the drain of the transistor M23, and a gate configured to receive a bias voltage $V_{B1}$ (or a first bias voltage). The first bias voltage $V_{B1}$ may be smaller than the first voltage V1 at the input terminal IN. The first bias voltage $V_{B1}$ may be proportional to the first voltage V1 at the input terminal IN. The switch transistor MS1 is turned off when the absolute value of the bias voltage $V_{B1}$ is less than the absolute value of the threshold voltage of the switch transistor MS1. The switch transistor MS1 is turned on when the absolute value of the bias voltage $V_{B1}$ is greater than the absolute value of the threshold voltage of the switch transistor MS1. For example, in the event that the switch transistor MS1 is a p-type MOSFET, the switch transistor MS1 is turned off when the bias voltage $V_{B1}$ is higher than the threshold voltage of the switch transistor MS1. The switch transistor MS1 is turned on when the bias voltage $V_{B1}$ is lower than the threshold voltage of the switch transistor MS1.

The transistor MS4 may be referred to as a switch transistor. The switch transistor MS4 has a source electrically connected to the drain of the transistor M24 and the drain of the transistor M22, a drain electrically connected to the output node 153 of the amplifier 15, and a gate configured to receive a power control signal Pd2. The amplifier 15 may be configured to generate an output voltage $V_{AMP1}$ at the output node 153 (or at the drain of the switch transistor MS4). The output voltage $V_{AMP1}$ is proportional to a difference between the voltage $V_{FB}$ received by the first input node 151 and the voltage $V_{BG}$ received by the second input node 152.

The switch transistor MS4 is turned off when the absolute value of the power control signal Pd2 is less than the absolute value of the threshold voltage of the switch transistor MS4. The switch transistor MS4 is turned on when the absolute value of the power control signal Pd2 is greater than the absolute value of the threshold voltage of the switch transistor MS4. For example, in the event that the switch transistor MS4 is a p-type MOSFET, the switch transistor MS4 is turned off when the power control signal Pd2 is higher than the threshold voltage of the switch transistor MS1. The switch transistor MS4 is turned on when the power control signal Pd2 is lower than the threshold voltage of the switch transistor MS4.

The transistors M21, M22, M23, M24, MS1, and MS4 may each include a short-channel transistor. The transistors M21, M22, M23, M24, MS1, and MS4 may each include a transistor with a minimum-available channel length. The transistors M21, M22, M23, M24, MS1, and MS4 may each include a FIN-FET. The transistors M21, M22, M23, M24, MS1, and MS4 may each include a core transistor. The core transistor may be defined as a transistor manufactured in a core region of a semiconductor device. The core transistor may be defined as a transistor manufactured at a minimum-available dimension. For example, the gate length of the core transistor may be significantly smaller than an I/O transistor or a high-voltage transistor. The gate length of the core transistor may be, for example, less than or equal to, but is not limited to, around 65 nm, 45 nm, 28 nm, 20 nm, 14 nm, 10 nm, 7 nm, 5 nm, 3 nm, 1 nm or less.

The power stage 30 has a first terminal 301 electrically connected to the input terminal IN of the electronic device 1, a second terminal 302 electrically connected to the output node 153 of the amplifier 15, and a third terminal 303 electrically connected to the output terminal OUT of the electronic device 1. The third terminal 303 may be electrically connected to the load capacitor $C_L$. The third terminal 303 of the power stage 30 may be electrically connected to an external system.

The power stage 30 includes a transistor M31 and a transistor M32. The transistor M31 or M32 may include a MOS field-effect transistor (FET). The transistor M31 or M32 may include a p-type MOSFET or an n-type MOSFET. The exemplary transistor as shown in FIG. 1 for the transistor M31 or M32 will be a p-type MOSFET.

The transistor M31 has a source electrically connected to the input terminal IN of the electronic device 1, a gate electrically connected to the output node 153 of the amplifier 15, a drain electrically connected to a source of the transistor M32. The gate of the transistor M31 may be configured to receive the output voltage $V_{AMP1}$ from the amplifier 15. The transistor M31 may be configured to generate a current $I_{SD}$ from the source to the drain of the transistor M31 based on the magnitude of the voltage at the gate, e.g., the output voltage $V_{AMP1}$. If the absolute value of the voltage at the gate of the p-type transistor M31 is lower, the current $I_{SD}$ will be greater, and vice versa.

The transistor M32 has the source electrically connected to the drain of the transistor M31, a gate configured to receive an adaptive bias voltage $V_{BA}$, and a drain electrically connected to the output terminal OUT of the electronic device 1.

The transistor M31 or M32 may include a short-channel transistor. The transistor M31 or M32 may include a transistor with a minimum-available channel length. The transistor M31 or M32 may include a FIN-FET. The transistor M31 or M32 may include a core transistor. The core transistor may be defined as a transistor manufactured in a core region of a semiconductor device. The core transistor may be defined as a transistor manufactured at a minimum-available dimension. For example, the gate length of the core transistor may be significantly smaller than an I/O transistor or a high-voltage transistor. The gate length of the core transistor may be, for example, less than or equal to, but is not limited to, around 65 nm, 45 nm, 28 nm, 20 nm, 14 nm, 10 nm, 7 nm, 5 nm, 3 nm, 1 nm or less.

The compensation circuit 40 includes a resistor $R_C$ and a capacitor $C_C$ connected in series. The compensation circuit 40 is electrically connected between the gate of the transistor M31 of the power stage 30 and the drain of the transistor 32 of the power stage M31. In some embodiments, the output node 153 of the amplifier 15 may generate a first pole in the frequency response for the electronic device 1. The output terminal OUT may generate a second pole in the frequency response for the electronic device 1. The value of the second pole may exceed that of the first pole. The compensation circuit 40 may generate a zero for the frequency response of the electronic device 1. The first pole generated at the output node 153 of the amplifier 15 may be cancelled out by the zero generated by the compensation circuit 40. As such, the electronic device 1 is more stable. Output noise (e.g., the thermal noise) at the output terminal OUT can be minimized.

The feedback circuit 50 includes a first resistor $R_{FB1}$ and a second resistor $R_{FB2}$ connected in series. The feedback circuit 50 has a first terminal 501 electrically connected to the output terminal OUT or the third terminal 303 of the power stage 30, a second terminal 502 between the first resistor $R_{FB1}$ and the second resistor $R_{FB2}$, and a third terminal 503 connected to the ground VSS. The second terminal 502 of the feedback circuit 50 is configured to provide the feedback voltage $V_{FB}$ to the amplifier 15, e.g., the first input node 151 of the amplifier 15. The ratio of the feedback voltage $V_{FB}$ and the voltage V2 at the output terminal OUT may be equal to the ratio of $R_{FB2}/(R_{FB1}+R_{FB2})$. The feedback voltage $V_{FB}$ may be smaller than the voltage V2 at the output terminal OUT.

The feedback circuit 50 may build a negative feedback loop for the electronic device 1. The electronic device 1 is configured to maintain the voltage V2 at the output terminal OUT. For example, when the voltage V2 at the first terminal 151 of the feedback circuit 50 (or at the output terminal OUT) increases, the feedback voltage $V_{FB}$ increases, which in turn raises the difference between the feedback voltage $V_{FB}$ at the first input terminal 151 and the reference voltage $V_{BG}$ at the second input terminal 152 of the amplifier 15. Therefore, the amplifier 15 generates a greater output voltage $V_{AMP1}$, which is in turn introduced to the gate of the transistor M31. Subsequently, the drain current $I_{SD}$ is lower, as is the voltage V2 at the output terminal OUT accordingly.

The electronic device 1 is configured to receive the first voltage V1 at the input terminal IN and, in response to the first voltage V1, provide the second voltage V2 at the output terminal OUT, which may connect to a next stage or an external system. The second voltage V2 is relatively more stable than the first voltage V1. The second voltage V2 may be lower than the first voltage V1. For example, the first voltage V1 may be around 2.0V and the second voltage V2 around 1.0V. The transistor M31 or M32 may include a core transistor, which can be applied with a core-specific maximum voltage between the gate and the drain, the gate and the source, or the drain and the source. In some embodiments, the core-specific maximum voltage is around 1.0V, 0.75V, or less. The voltage applied between the drain and source of the transistor M31, between the drain and gate of the transistor M31, or between the gate and source of the transistor M31 of the power stage 30 should be lower than the core-specific maximum voltage to ensure reliability.

The adaptive bias voltage $V_{BA}$ may be varied in response to the voltage at the input terminal IN of the electronic device 1. In response to the adaptive bias voltage $V_{BA}$, a voltage applied between the drain and source of the transistor M31, between the drain and gate of the transistor M31, or between the gate and source of the transistor M31 of the power stage can be controlled to be less than or equal to the core-specific maximum voltage. The transistor M32 is configured to, in response to the adaptive bias voltage $V_{BA}$, constrain the voltage drop on the junction within the transistor M31, and protect the transistor M31 from being stressed in a high-voltage condition (e.g., the transistor M31 operates at a voltage exceeding the core-specific maximum voltage). As such, the transistor M31 will not experience the high-voltage-induced damage. In some embodiments, the transistor M32 is configured to constrain the current $I_{SD}$ in response to the adaptive bias voltage $V_{BA}$, and protect the transistor M31 from being stressed in a high-voltage condition. Furthermore, in response to the adaptive bias voltage $V_{BA}$, a voltage applied between the drain and source of the transistor M32, between the drain and gate of the transistor M32, or between the gate and source of the transistor M32 may be lower or equal to the core-specific maximum voltage. As such, the transistor M32 will not experience any high-voltage-induced damage.

In some embodiments, the power stage 30 may include more transistors for the protection of the transistor M31 from being stressed in a high-voltage condition.

In an LDO circuit, a power transistor responsible for generating an output voltage would have to sustain a relatively high voltage drop. Generally, the power transistor would be an I/O transistor with a high threshold voltage and a high voltage endurance. However, the drawbacks of the I/O transistor, such as limited input range and incompatible manufacturing process, are no longer suitable for some wide operation voltage range circuits, such as, system-on-chip (SOC) digital circuits with dynamic voltage and frequency scaling, and high-performance circuits such as a computer processing unit (CPU), graphic processing unit (GPU), or super computer applications.

In the present disclosure, the core transistor M31 of the power stage has a relatively strong driving capability which means that it can achieve the same driving current as an I/O transistor, but with a smaller size. The relatively small size of the core transistor M31 can reduce the size of the electronic device 1. The relatively small threshold voltage of the core transistor M31 promises a wider input range. The core transistor M32 protects the core transistor 31 from being stressed in a high-voltage condition. Therefore, the power stage 30 with core transistors has a relative strong driving capacity and a relatively small size in comparison with an I/O power transistor. Furthermore, the electronic device 1, which consists of core transistors, is compatible with the manufacturing of the advanced node. For example, the electronic device 1 (e.g., the LDO circuit) and other high-performance circuits can be manufactured under the same process flow. The integration of the electronic device (e.g., the LDO circuit) and the other high-performance circuits can be improved.

The electronic device is configured to operate in a first mode when the gate of the transistor M31 receives the output voltage $V_{AMP1}$ from the amplifier 15. The electronic device 1 is configured to operate in a second mode when the gate of the transistor M24 and the gate of the transistor M31 are pulled up to a power supply. In some embodiments, the gate of the transistor M24 may be electrically connected to a reset transistor, and such reset transistor may be configured to pull the voltage at the gate of the transistor M24 to the power supply. The amplifier 15 is thereby disabled. In some embodiments, the gate of the transistor M31 may be electrically connected to a reset transistor, and such reset transistor may be configured to pull the voltage at the gate of the transistor M31 to the power supply. The power stage 30 is thereby disabled.

The first mode indicates that the electronic device 1 is enabled. In some embodiments, the first mode may be referred to as a normal mode. The second mode indicates that the electronic device 1 is disabled. In some embodiments, the second mode may be referred to as a power down mode.

In the first mode, the switch transistor MS4 is turned on in response to the power control signal Pd2. For example, the power control signal Pd2 may be logic low and the p-type switch transistor MS4 may be turned on. In some embodiments, electronic device 1 is configured to operate in the first mode, when the switch transistor MS4 is turned on.

In the second mode, the switch transistor MS4 is turned off in response to the power control signal Pd2. For example, the power control signal Pd2 may be logic high and the p-type switch transistor MS4 may be turned off. The switch transistor MS4 is configured to isolate the amplifier 15 from the power stage 30 (e.g., the gate of the transistor M31 of the power stage 30) during the pull-up of the gate of the transistor M31. In some embodiments, the electronic device 1 is configured to operate in the second mode when the switch transistor MS4 is turned off.

Figure 2:
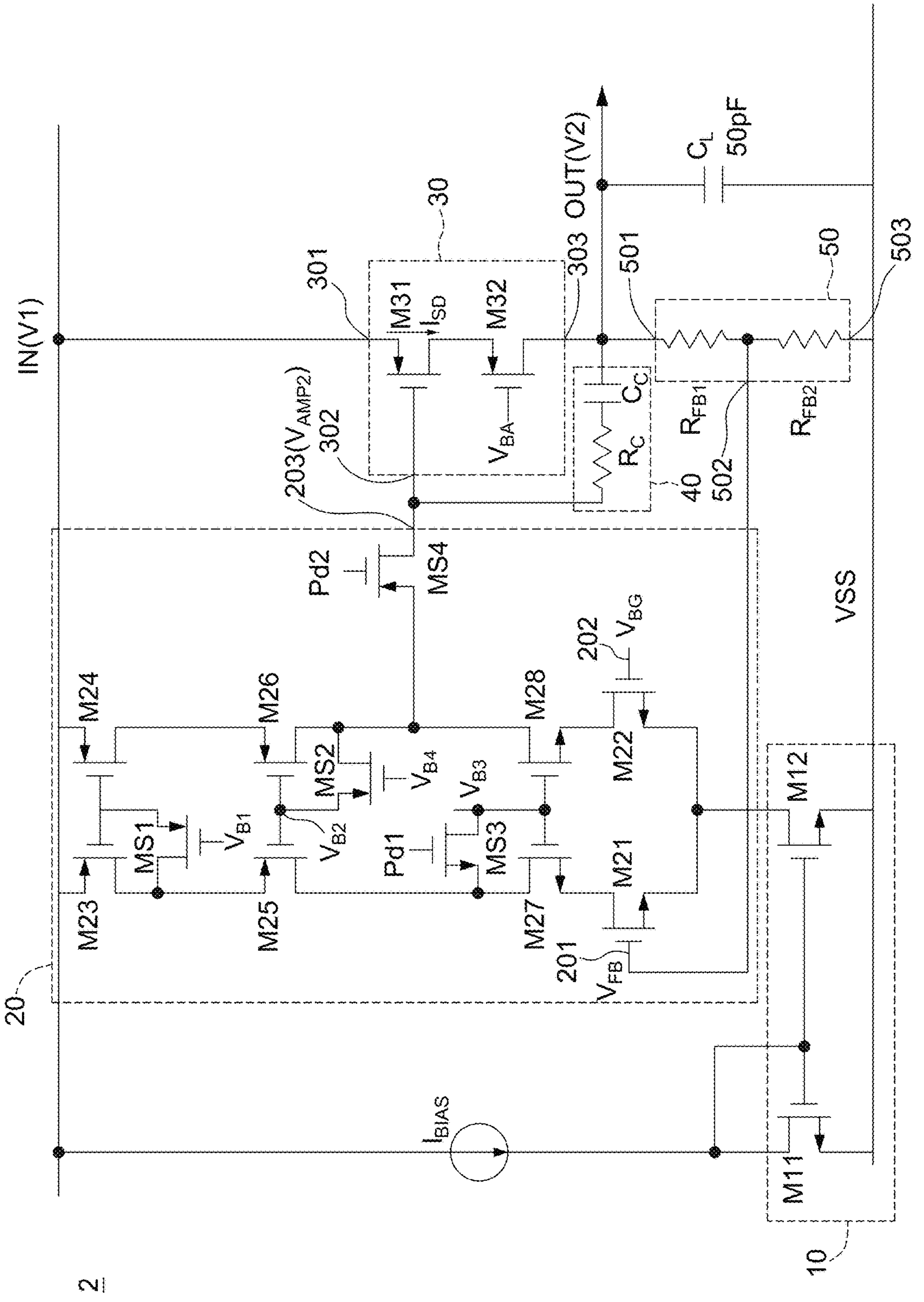
FIG. 2 illustrates a schematic diagram of an electronic device in accordance with some embodiments of the present disclosure.

FIG. 2 is a schematic diagram of an electronic device 2 in accordance with some embodiments of the present disclosure. The electronic device 2 may be referred to as an LDO circuit. The electronic device 2 of FIG. 2 is similar to the electronic device 1 of FIG. 1, and some of the differences therebetween are as follows.

The electronic device 2 includes an amplifier 20. The amplifier 20 has a first input node 201 and a second input node 202, and an output node 203. The amplifier 20 may be an OPA. The amplifier 20 is configured to amplify the difference between the feedback voltage $V_{FB}$ received by the first input node 201 and the reference voltage $V_{BG}$ received by the second input node 202, and to provide a voltage $V_{AMP2}$ at the output node 203 proportional thereto.

The amplifier 20 of the electronic device 2 is similar to the amplifier 15 of the electronic device 1, except that the amplifier 20 further includes transistors M25, M26, M27, M28, MS2, and MS3. The amplifier 20 may be a cascode operation amplifier. The transistors M25, M26, M27, M28, MS2, and MS3 may each include a MOS field-effect transistor (FET). The transistors M25, M26, M27, M28, MS2, and MS3 may each include a p-type MOSFET or an n-type MOSFET. The exemplary transistor as shown in FIG. 2 for the transistors M27, M28, and MS3 will be an n-type MOSFET. The exemplary transistor as shown in FIG. 2 for the transistor M25, M26, or MS3 will be a p-type MOSFET.

The transistor M25 has a source electrically connected to the drain of the transistor M23, a gate electrically connected to a gate of the transistor M26, and a drain electrically connected to the drain of the transistor M27. The transistor M26 has a source electrically connected to the drain of the transistor M24, a gate electrically connected to the gate of the transistor M25, and a drain electrically connected to the drain of the transistor M28. The drain of the transistor M26 is electrically connected to the source of the switch transistor MS4. The gate of the transistor M25 and the gate of the transistor M26 are configured to receive a bias voltage $V_{B2}$ (or a second bias voltage). The second bias voltage $V_{B2}$ is smaller than the bias voltage $V_{B1}$ applied on the gate of the switch transistor MS1. The first bias voltage $V_{B2}$ may be proportional to the first voltage V1 at the input terminal IN.

The transistor M27 has a source electrically connected to the drain of the transistor M21, a gate electrically connected to a gate of the transistor M28, and a drain electrically connected to the drain of the transistor M25. The transistor M28 has a source electrically connected to the drain of the transistor M22, the gate electrically connected to the gate of the transistor M27, and a drain electrically connected to the drain of the transistor M28. The drain of the transistor M28 is electrically connected to the source of the switch transistor MS4. The gate of the transistor M27 and the gate of the transistor M28 are configured to receive a bias voltage $V_{B3}$ (or a third bias voltage). The third bias voltage $V_{B3}$ is smaller than the second bias voltage $V_{B2}$ The third bias voltage $V_{B3}$ may be proportional to the first voltage V1 at the input terminal IN.

The switch transistor MS2 has a source electrically connected to the gate of the transistor M26, a gate configured to receive a bias voltage $V_{B4}$ (or a fourth bias voltage), and a drain electrically connected to the drain of the transistor M26. The switch transistor MS3 has a source electrically connected to the drain of the transistor M27, a gate configured to receive a power control signal Pd1, and a drain electrically connected to the gate of the transistor M27. The fourth bias voltage $V_{B4}$ is smaller than the first voltage V1 at the input terminal. The fourth bias voltage $V_{B4}$ may be proportional to the first voltage V1 at the input terminal IN. The fourth bias voltage $V_{B4}$ is greater than the first bias voltage $V_{B1}$.

The transistors M25, M26, M27, M28, MS2, and MS3 may each include a short-channel transistor. The transistors M25, M26, M27, M28, MS2, and MS3 may each include a transistor with a minimum-available channel length. The transistors M25, M26, M27, M28, MS2, and MS3 may each include a FIN-FET. The transistors M25, M26, M27, M28, MS2, and MS3 may each include a core transistor. The core transistor may be defined as a transistor manufactured in a core region of a semiconductor device. The core transistor may be defined as a transistor manufactured at a minimum-available dimension. For example, the gate length of the core transistor may be significantly smaller than an I/O transistor or a high-voltage transistor. The gate length of the core transistor may be, for example, less than or equal to, but is not limited to, around 65 nm, 45 nm, 28 nm, 20 nm, 14 nm, 10 nm, 7 nm, 5 nm, 3 nm, 1 nm or less.

Table I as provided here illustrates the exemplary voltages at different nodes in the electronic device 1 in the first mode (normal mode) and the second mode (power down mode):

TABLE I

| Node | Normal Mode | Power Down Mode |
|---|---|---|
| V1 | Logic High | Logic High |
| $V_{B1}$ | Logic Low | Logic High |
| $V_{B2}$ | Logic High | Logic High |
| $V_{B3}$ | Logic High | Logic High |
| $V_{B4}$ | Logic High | Logic Low |
| Pd1 | Logic Low | Logic High |
| Pd2 | Logic Low | Logic High |

Figure 3A:
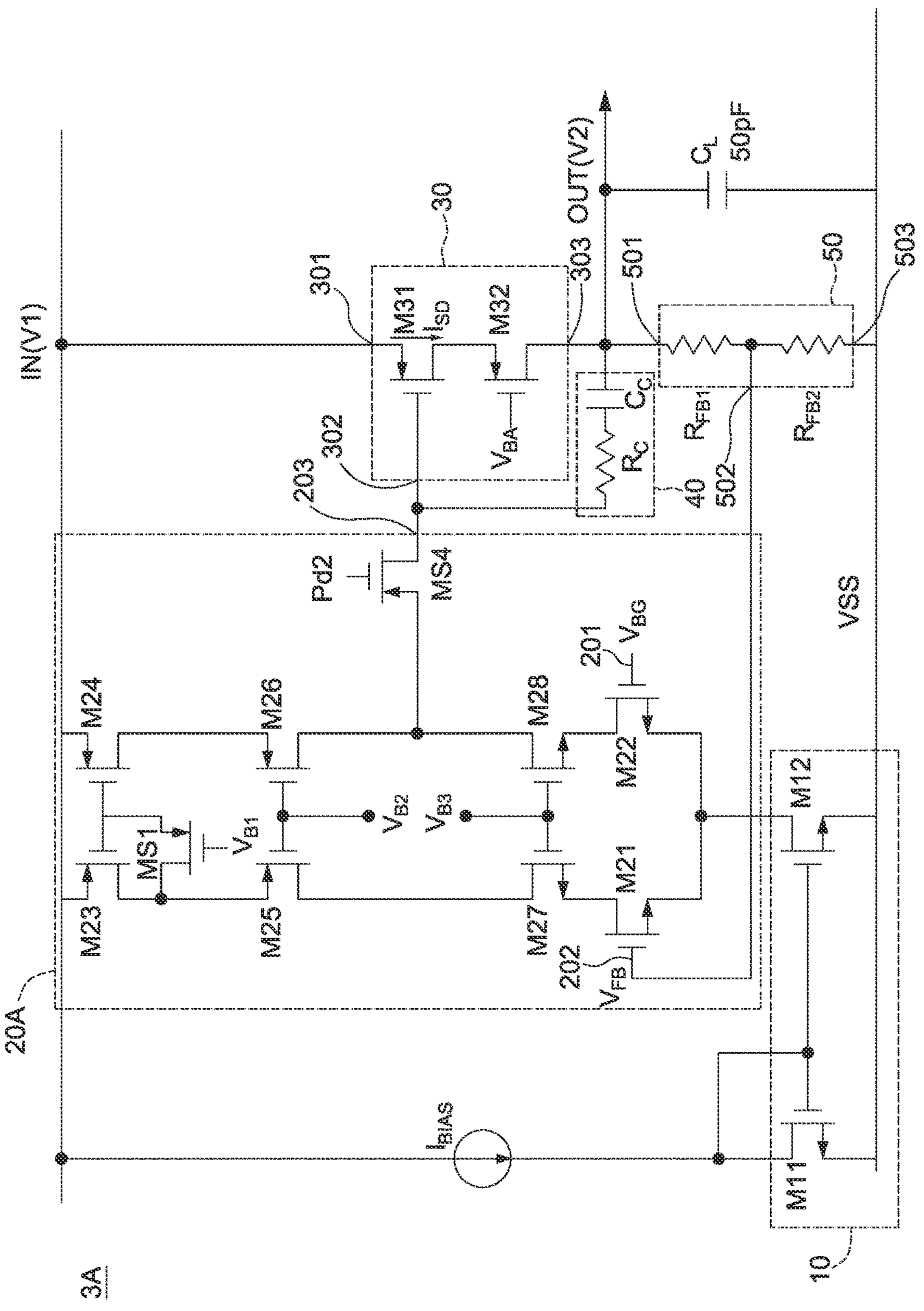
FIG. 3A is an equivalent circuit of the electronic device as shown in FIG. 2, in accordance with some embodiments of the present disclosure.

FIG. 3A shows an equivalent circuit 3A of the electronic device 2 in the first mode as shown in FIG. 2, in accordance with some embodiments of the present disclosure. The switch transistor MS1 connects the gate and the source of the transistor M23 in response to the first bias voltage $V_{B1}$, and the transistor M23 operates in a diode-connected mode. The diode-connected transistor M23 acts as an active load and mirrors the current from the transistor M23 to the transistor M24. For example, the first bias voltage $V_{B1}$ may be logic low and the p-type switch transistor MS1 may be turned on. The first bias voltage $V_{B1}$ is adapted with the voltage V1 at the input terminal IN. In some embodiments, when the voltage V1 is low, the first bias voltage $V_{B1}$ is low and vice versa. The first bias voltage $V_{B1}$ is a division of the voltage V1 at the input terminal IN.

The switch transistor MS2 is turned off in response to the fourth bias voltage $V_{B4}$. For example, the fourth bias voltage $V_{B4}$ may be logic high and the p-type switch transistor MS2 may be turned off. The fourth bias voltage $V_{B4}$ is adapted with the voltage V1 at the input terminal IN. In some embodiments, when the voltage V1 is low, the fourth bias voltage $V_{B4}$ is low and vice versa. The bias voltage $V_{B4}$ is a division of the voltage V1 at the input terminal IN.

The switch transistor MS3 is turned off in response to the power control signal Pd1. For example, the power control signal Pd1 may be logic low and the n-type switch transistor MS3 may be turned off. The switch transistor MS4 is turned on in response to the power control signal Pd2. For example, the power control signal Pd2 may be logic low and the p-type switch transistor MS4 may be turned on.

In some embodiments, the electronic device 1 is configured to operate in the first mode when the switch transistor MS1 is turned on and the switch transistor MS2 and switch transistor MS3 are turned off.

As shown in FIG. 3A, an equivalent circuit 20A of the cascode operational amplifier 20 of FIG. 2 is configured to receive the feedback voltage $V_{FB}$ at the first input node 201 and the reference voltage $V_{BG}$ at the second input node 202, and provide the output voltage $V_{AMP2}$ at the output node 203. The power stage 30 is configured to receive the output voltage $V_{AMP2}$ at the gate and, in response to the $V_{AMP2}$ and the voltage V1 from the input terminal IN, generate the current $I_{SD}$. The power stage 30 is then configured to provide the voltage V2 at the output terminal OUT based on the current $I_{SD}$ and the equivalent impedance at the output terminal OUT.

The second bias voltage $V_{B2}$ is adapted with the voltage V1 at the input terminal IN. In some embodiments, when the voltage V1 is low, the second bias voltage $V_{B2}$ is low and vice versa. The second bias voltage $V_{B2}$ is a division of the voltage V1 at the input terminal IN. The third bias voltage $V_{B3}$ is adapted with the voltage V1 at the input terminal IN. In some embodiments, when the voltage V1 is low, the third bias voltage $V_{B3}$ is low and vice versa. The third bias voltage $V_{B3}$ is a division of the voltage V1 at the input terminal IN. Since the second bias voltage $V_{B2}$ and the third bias voltage $V_{B3}$ are adapted with the voltage V1 at the input terminal IN, the input voltage range of the electronic device 1 will increase.

Figure 3B:
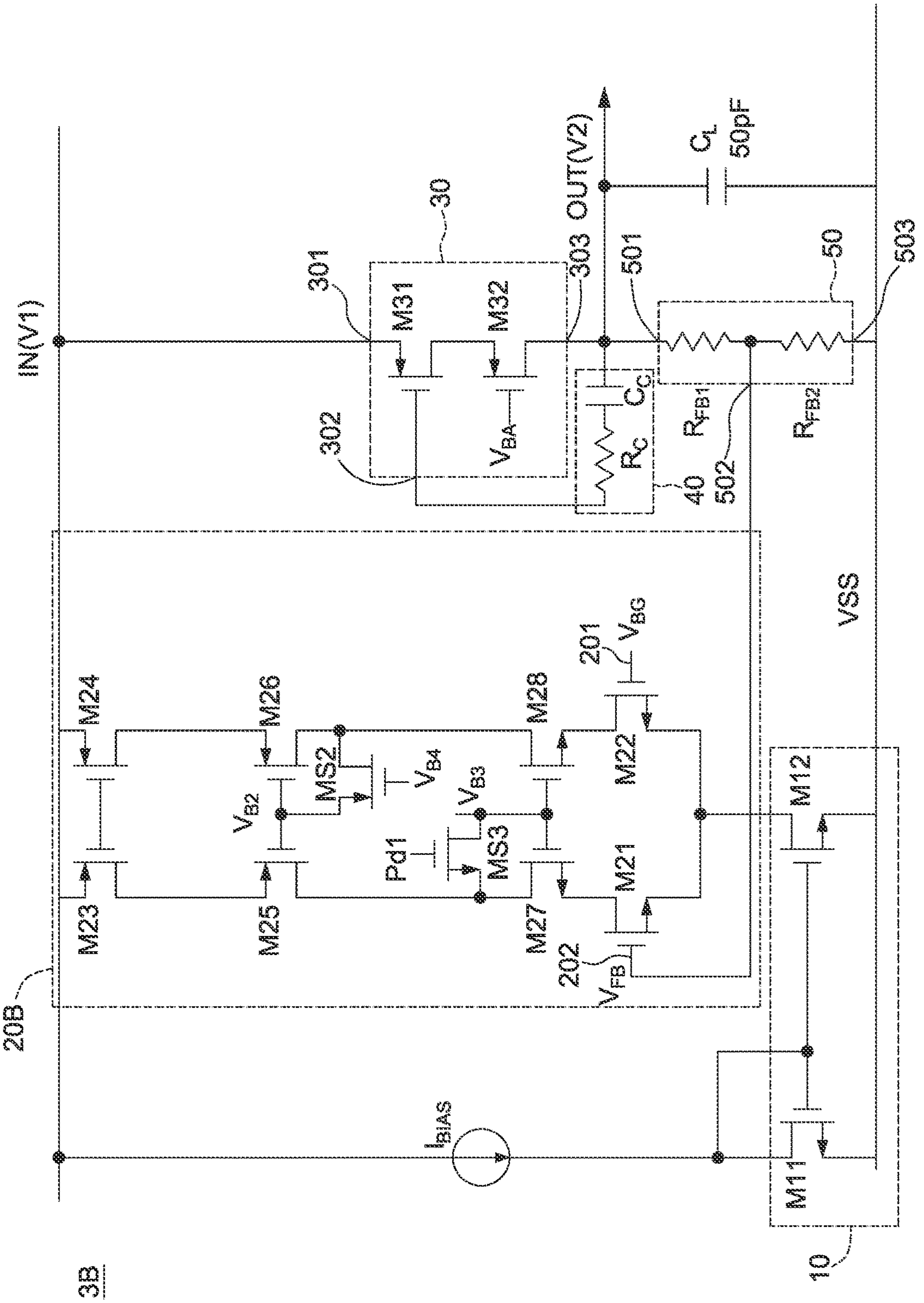
FIG. 3B is an equivalent circuit of the electronic device as shown in FIG. 2, in accordance with some embodiments of the present disclosure.

FIG. 3B shows an equivalent circuit 3B of the electronic device 2 in the second mode as shown in FIG. 2, in accordance with some embodiments of the present disclosure. The switch transistor MS1 disconnects the gate and the source of the transistor M23 in response to the first bias voltage $V_{B1}$. For example, the first bias voltage $V_{B1}$ may be logic high and the p-type switch transistor MS1 may be turned off. The switch transistor MS2 is turned on in response to the fourth bias voltage $V_{B4}$. For example, the fourth bias voltage $V_{B4}$ may be logic low and the p-type switch transistor MS2 may be turned on. The switch transistor MS3 is turned on in response to the power control signal Pd1. For example, the power control signal Pd1 may be logic high and the n-type switch transistor MS3 may be turned on. The switch transistor MS4 is turned off in response to the power control signal Pd2. For example, the power control signal Pd2 may be logic high and the p-type switch transistor MS4 may be turned off.

In some embodiments, the electronic device 1 is configured to operate in the second mode when the switch transistor MS1 is turned off and the switch transistor MS2 and switch transistor MS3 are turned on.

As shown in FIG. 3B, an equivalent circuit 20B of the amplifier 20 is electrically isolated from the power stage 30 when the switch transistor MS4 is turned off. The gate of the transistor M31 can be pulled up to the power supply without any interference from the amplifier 20. Therefore, no high voltage will be applied between the gate and the drain, the drain and the source, or the gate and the source of the transistor M31. Furthermore, the core transistors M25, M26, M27, and M28 may form a self-biased loop and a voltage at the node between the drain of the core transistor M26 and the drain of the transistor core M28 may be stable at a certain level, instead of floating. Due to being self-biased, and as a result of the isolation by the switch transistor MS4, the core transistors M26 and M28 will be insulated from any noise disturbance. Therefore, no relatively high voltage will be applied between the gate and the drain, the drain and the source, or the gate and the source of the core transistor M26. Similarly, no relatively high voltage will be applied between the gate and the drain, the drain and the source, or the gate and the source of the core transistor M28. The core transistors M26 and M28 are free from being stressed in a high-voltage condition (e.g., any voltage which exceeds the core-specific maximum voltage).

Figure 4:
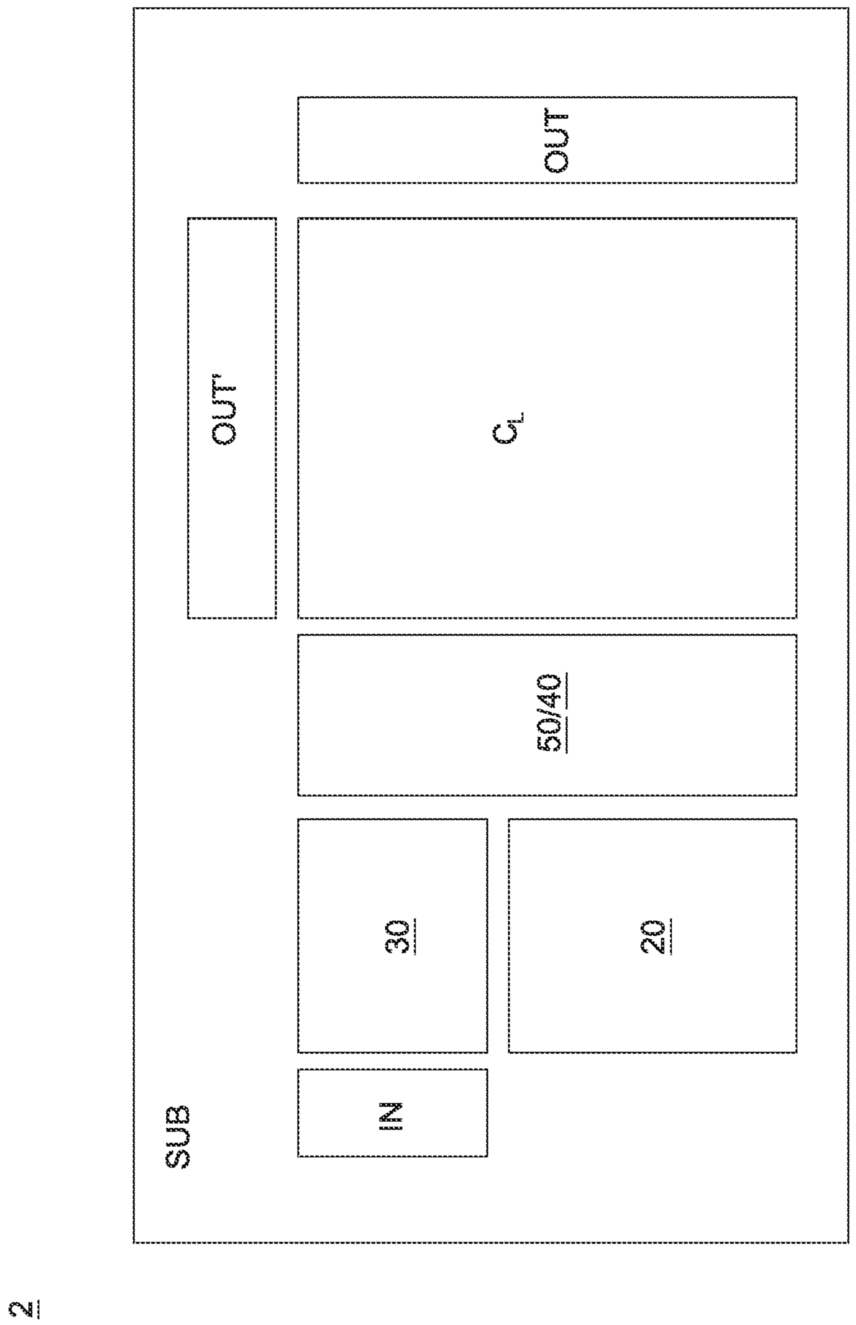
FIG. 4 is a top view of an electronic device in accordance with some embodiments of the present disclosure.

FIG. 4 is a top view of the electronic device 2 in FIG. 2 in accordance with some embodiments of the present disclosure. The power stage 30 is disposed adjacent to the amplifier 20 and the feedback circuit 50. The compensation circuit 40 is disposed between the amplifier 20 and the load capacitor $C_L$. The feedback circuit 50 is disposed between the amplifier 20 and the load capacitor $C_L$. The feedback circuit 50 and the compensation circuit 40 may be integrated. The feedback circuit 50 and the compensation circuit 40 may consist of one or more capacitor array and one or more resistor to improve the resistor-capacitor (RC) network matching. The feedback circuit 50 is disposed between the power stage 30 and the load capacitor $C_L$. The output terminal may be disposed adjacent the load capacitor $C_L$. The power stage 30 may have a substantially rectangular area on a substrate SUB in which the electronic device 2 is disposed. The rectangular power stage 30 enlarges the total width of the conductive lines through the power stage 30 from the input terminal IN to the output terminal OUT.

The load capacitor $C_L$ may have a substantially rectangular area on the substrate SUB. The amplifier 20 may have a substantially rectangular area on the substrate SUB. The feedback circuit 50 may have a substantially rectangular area on the substrate SUB. Furthermore, the electronic device 2 includes another output terminal OUT' adjacent to the other side of the load capacitor $C_L$.

Figure 5:
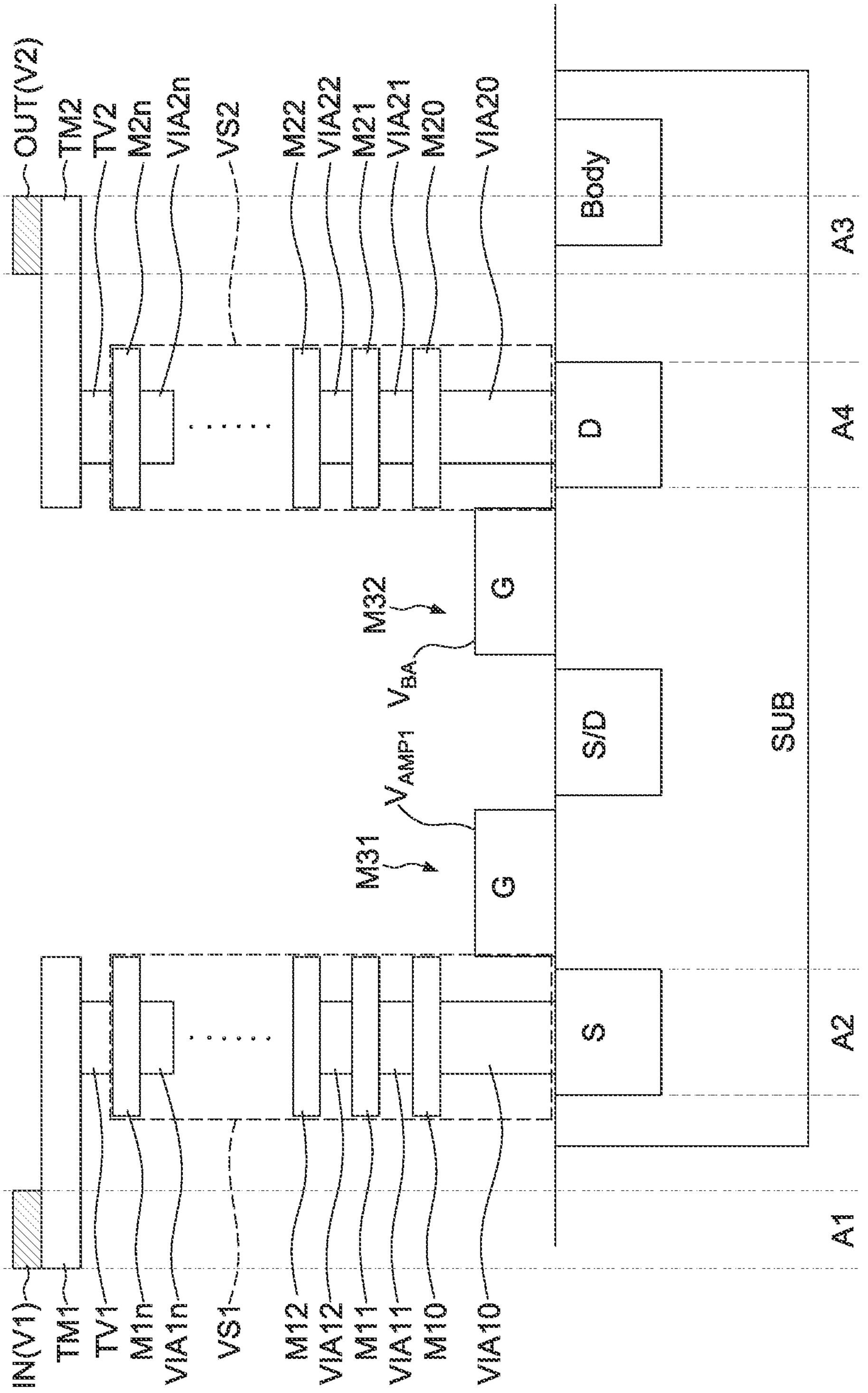
FIG. 5 is a cross-sectional view of an electronic device in accordance with some embodiments of the present disclosure.

FIG. 5 is a cross-sectional view of the electronic device 1 in FIG. 1 in accordance with some embodiments of the present disclosure. As shown in FIG. 5, the electronic device 1 further includes a first via stacking structure VS1 disposed on the source of the transistor M31, a second via stacking structure VS2 disposed on the drain of the transistor M32, a first conductive via TV1, a second conductive via TV2, a first conductive layer TM1, and a second conductive layer TM2.

The first via stacking structure VS1 includes a plurality of conductive vias VIA10, VIA11, VIA12 . . . , VIA1*n* and a plurality of conductive layers M10, M11 . . . , M1*n*. The reference "n" is a positive integer. The first via stacking structure VS1 is electrically connected to the source of the transistor M31. The first via stacking structure VS1 extends from the source of the transistor M31 vertically. The first conductive via TV1 connects the first conductive layer TM1 and the first via stacking structure VS1. The first conductive layer TM1 is configured to receive the voltage V1 from the input terminal IN. The first conductive layer TM1 may have a smaller resistivity than any of the conductive layers M10, M11 . . . , M1*n* of the first stacking via structure VS1.

The second via stacking structure VS2 includes a plurality of conductive vias VIA20, VIA21, VIA22 . . . , VIA2*n* and a plurality of conductive layers M20, M21 . . . , M2*n*. The second via stacking structure VS2 is electrically connected to the drain of the transistor M32. The second via stacking structure VS2 extends from the drain of the transistor M32 vertically. The second conductive via TV2 connects the second conductive layer TM2 and the second via stacking structure VS2. The second conductive layer TM2 is configured to provide the voltage V2 to the output terminal OUT. The second conductive layer TM2 may have a smaller resistivity than any of the conductive layers M20, M21 . . . , M2*n* of the second stacking via structure VS2.

The input terminal IN has a first projecting area A1 on the substrate and the source of the transistor M31 has a second projecting area A2 on the substrate. The first projecting area A1 is free from overlapping the second projecting area A2. In other words, the first projecting area A1 does not overlap the second projecting area A2. The first via stacking structure VS1 extends between and electrically connects the input terminal IN and the source of the transistor M31. The first conductive layer TM1 may extend in a direction perpendicular to the extending direction of the first via stacking structure VS1. Therefore, the current path between the input terminal IN and the source of the transistor M31 is mainly within the first conductive layer TM1 having a smaller resistivity. As such, the IR drop between the input terminal IN and the source of the transistor M31 is less and the electron migration (EM) effect can be improved.

The terminal OUT has a third projecting area A3 on the substrate and the drain of the transistor M32 has a fourth projecting area A4 on the substrate. The third projecting area A3 is free from overlapping the fourth projecting area A4. In other words, the third projecting area A3 does not overlap the fourth projecting area A4. The second via stacking structure VS2 extends between and electrically connects the output terminal OUT with the drain of the transistor M32. The second conductive layer TM2 may extend in a direction perpendicular to the extending direction of the second via stacking structure VS2. Therefore, the current path between the output terminal OUT and the drain of the transistor M31 is mainly within the second conductive layer TM2 having a smaller resistivity. As such, the IR drop the output terminal OUT and the drain of the transistor M31 is less and the EM effect can improved.

The first via stacking structure VS1 may include metal materials, such as Cu, Ti, Ta, Au, Al, or the like. The second via stacking structure VS2 may include metal materials, such as Cu, Ti, Ta, Au, Al, or the like. The first conductive via TV1, a second conductive via TV2, a first conductive layer TM1, and a second conductive layer TM2 may each include metal materials, such as Cu, Ti, Ta, Au, Al, or the like.

Figure 6:
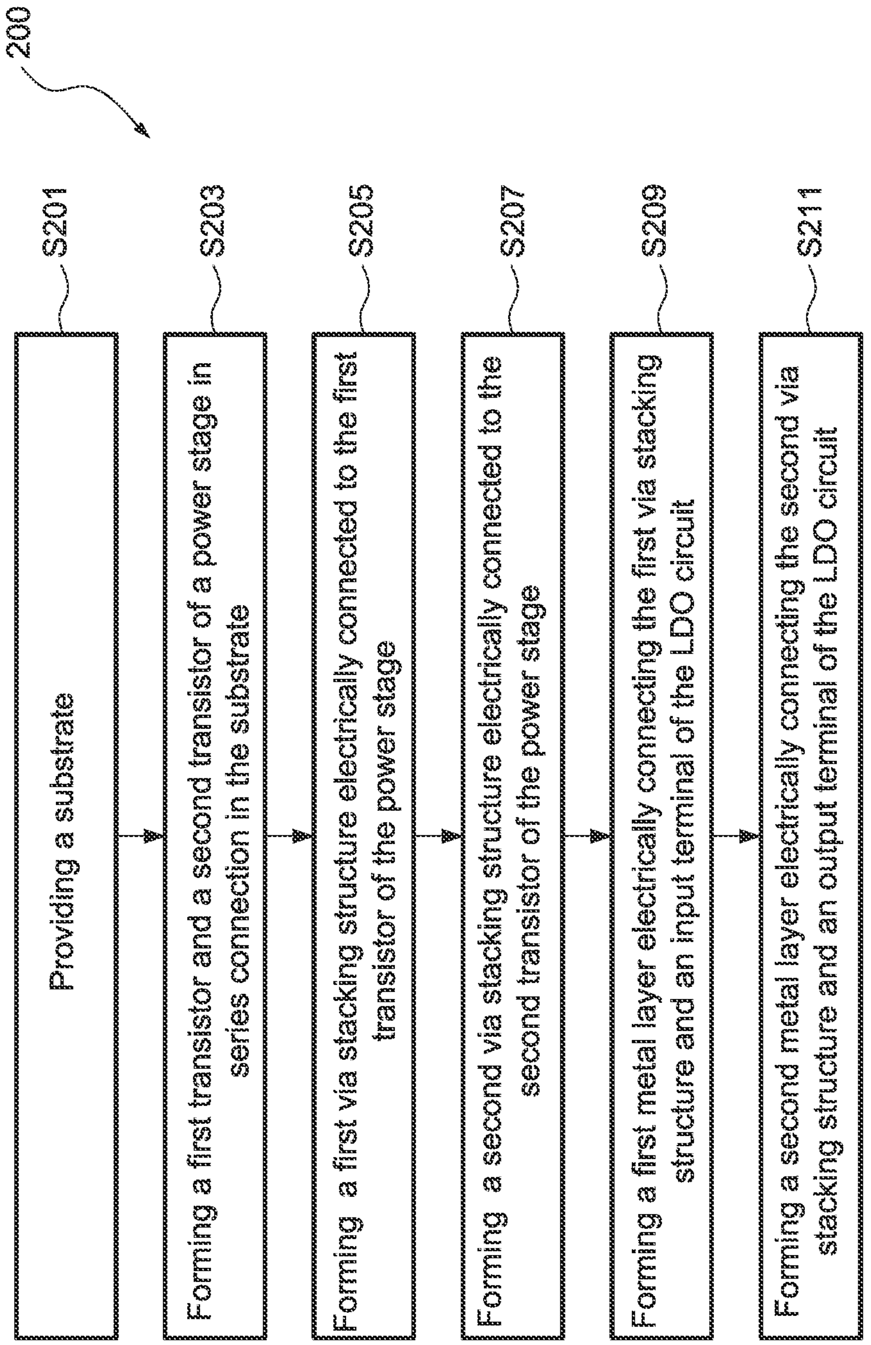
FIG. 6 is a flow chart of manufacturing an electronic device in accordance with some embodiments of the present disclosure.

FIG. 6 is a flow chart of a method 200 of manufacturing an LDO circuit (e.g., the electronic device 1 in FIG. 1) in accordance with some embodiments of the present disclosure. The method 200 includes steps S201, S203, S205, S207, S209, and S211.

In step S201, a substrate is provided. The substrate may include a doped wafer.

In step S203, a first transistor (e.g., the transistor M31) and a second transistor (e.g., the transistor M32) of a power stage (e.g., the power stage 30) are formed in a series connection in the substrate. The first transistor has a source electrically connected to an input terminal of the LDO circuit. The second transistor has a source electrically connected to a drain of the first transistor, a gate configured to receive an adaptive bias voltage (e.g., the adaptive bias voltage $V_{BA}$), a drain electrically connected to an output terminal of the LDO circuit.

In step S205, a first via stacking structure (e.g., the first via stacking structure VS1) is formed to be electrically connected to the first transistor of the power stage.

In step S207, a second via stacking structure (e.g., the second via stacking structure VS2) is formed to be electrically connected to the second transistor of the power stage.

In step S209, a first conductive layer (e.g., the first conductive layer TM1) is formed to electrically connect the first via stacking structure and the input terminal of the LDO circuit. The first via stacking structure extends between and electrically connects the input terminal and the source of the transistor. The first conductive layer may extend in a direction perpendicular to the extending direction of the first via stacking structure. Therefore, the current path between the input terminal and the source of the first transistor is mainly within the first conductive layer having a smaller resistivity. As such, the IR drop between the input terminal and the source of the first transistor is less and the EM effect can be improved.

In step S211, a second conductive layer (e.g., the second conductive layer TV2) is formed to electrically connect the second via stacking structure and the output terminal of the LDO circuit. The second via stacking structure extends between and electrically connects the output terminal with the drain of the second transistor. The second conductive layer may extend in a direction perpendicular to the extending direction of the second via stacking structure. Therefore, the current path between the output terminal and the drain of the transistor is mainly within the second conductive layer having a smaller resistivity. As such, the IR drop between the output terminal and the drain of the transistor is less and the EM effect can be improved.

The present disclosure provides a low dropout (LDO) circuit. The LDO circuit includes an input terminal, an output terminal, a cascode operational amplifier, and a power stage. The cascode operational amplifier is electrically connected to the input terminal. The power stage has a first terminal electrically connected to the input terminal, a second terminal electrically connected to an output node of the cascode operational amplifier, and a third terminal electrically connected to the output terminal.

The present disclosure provides a low dropout (LDO) circuit. The LDO circuit includes an input terminal, an output terminal, an amplifier, and a power stage. The amplifier is electrically connected to the input terminal. The power stage has a first terminal electrically connected to the input terminal, a second terminal electrically connected to an output node of the amplifier, and a third terminal electrically connected to the output terminal. The amplifier includes a fourth switch transistor electrically connected to the output node of the amplifier.

The present disclosure provides a method of manufacturing an LDO circuit, including providing a substrate; forming a first transistor and a second transistor of a power stage in a series connection in the substrate, wherein the first transistor has a source electrically connected to an input terminal of the LDO circuit, and wherein the second transistor has a source electrically connected to a drain of the first transistor, a gate configured to receive an adaptive bias voltage, and a drain electrically connected to an output terminal of the LDO circuit.

The methods and features of the present disclosure have been sufficiently described by examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the disclosure of the present disclosure, processes, machines, manufacture, composition of matter, means, methods or steps presently existing or later to be developed, that perform substantially the same function or achieve substantially the same result as the corresponding embodiments described herein may be utilized according to the present disclosure.

Accordingly, the appended claims are intended to include within their scope such as processes, machines, manufacture, compositions of matter, means, methods or steps. In addition, each claim constitutes a separate embodiment, and the combination of various claims and embodiments are within the scope of the present disclosure.

What is claimed is:

1. A low dropout (LDO) circuit, comprising:
an input terminal;
an output terminal;
a cascode operational amplifier electrically connected to the input terminal; and
a power stage having a first terminal electrically connected to the input terminal, a second terminal electrically connected to an output node of the cascode operational amplifier, and a third terminal electrically connected to the output terminal,
wherein the power stage comprises:
a first transistor having a source electrically connected to the input terminal and a gate electrically connected to the output node of the cascode operational amplifier; and
a second transistor having a source electrically connected to a drain of the first transistor of the power stage, a gate configured to receive an adaptive bias voltage, and a drain electrically connected to the output terminal.

2. The LDO circuit of claim 1, wherein the cascode operational amplifier comprises:
a first transistor having a gate configured to receive a feedback voltage, wherein the feedback voltage is smaller than a voltage at the output terminal;
a second transistor having a gate configured to receive a reference voltage;
wherein a source of the first transistor of the cascode operational amplifier and a source of the second transistor of the cascode operational amplifier are electrically connected with each other.

3. The LDO circuit of claim 2, wherein the cascode operational amplifier further comprises:
a third transistor having a source electrically connected to the input terminal and a drain electrically connected to a drain of the first transistor of the cascode operational amplifier;
a fourth transistor having a source electrically connected to the input terminal and a drain electrically connected to a drain of the second transistor of the cascode operational amplifier,
wherein a gate of the third transistor and a gate of the fourth transistor are electrically connected with each other.

4. The LDO circuit of claim 3, wherein the cascode operational amplifier further comprises:
a first switch transistor having a source electrically connected to the gate of the third transistor, a drain electrically connected to the drain of the third transistor, and a gate configured to receive a first bias voltage,
wherein the first bias voltage is smaller than a voltage at the input terminal.

5. The LDO circuit of claim 4, wherein the cascode operational amplifier further comprises:
a fifth transistor having a source electrically connected to the drain of the third transistor;
a sixth transistor having a source electrically connected to the drain of the fourth transistor;
a seventh transistor having a source electrically connected to the drain of the first transistor of the cascode operational amplifier and a drain electrically connected to the drain of the fifth transistor;
an eighth transistor having a source electrically connected to the drain of the second transistor of the cascode operational amplifier and a drain electrically connected to the drain of the sixth transistor, wherein a gate of the fifth transistor and a gate of the sixth transistor are electrically connected with each other and configured to receive a second bias voltage, and wherein and a gate of the seventh transistor and a gate of the eighth transistor are electrically connected with each other and configured to receive a third bias voltage.

6. The LDO circuit of claim 5, wherein the third bias voltage is smaller than the second bias voltage, and the second bias voltage is smaller than the first bias voltage.

7. The LDO circuit of claim 5, wherein the cascode operational amplifier further comprises:

a second switch transistor having a source electrically connected to the gate of the sixth transistor, a drain electrically connected to the drain of the sixth transistor, and a gate configured to receive a fourth bias voltage, wherein the fourth bias voltage is smaller than the voltage at the input terminal.

8. The LDO circuit of claim 7, wherein the cascode operational amplifier further comprises:

a third switch transistor having a drain electrically connected to the gate of the seventh transistor, a source electrically connected to the drain of the seventh transistor, and a gate configured to receive a first power control signal.

9. The LDO circuit of claim 8, wherein:

the LDO circuit is configured to operate in a first mode when the first switch transistor is turned on and the second and third switch transistors are turned off, the LDO circuit is configured to operate in a second mode when the first switch transistor is turned off and the second and third switch transistors are turned on, and wherein the second mode indicates that the LDO circuit is disabled.

10. The LDO circuit of claim 8, wherein the cascode operational amplifier further comprises a fourth switch transistor having a source electrically connected to the drain of the sixth transistor, a drain electrically connected to the second terminal of the power stage, and a gate configured to receive a power control signal.

11. The LDO circuit of claim 10, wherein:

the LDO circuit operates in a first mode when the fourth switch transistor is turned on, the LDO circuit is configured to operate in a second mode when the fourth switch transistor is turned off, and wherein the second mode indicates that the LDO circuit is disabled.

12. The LDO circuit of claim 1, further comprising a compensation circuit electrically connected between the gate of the first transistor of the power stage and the drain of the second transistor of the power stage, wherein the compensation circuit provides a zero for a frequency response of the LDO circuit.

13. The LDO circuit of claim 1, further comprising a feedback circuit, wherein the feedback circuit has a first terminal electrically connected to the output terminal and a second terminal configured to provide a feedback voltage to the cascode operational amplifier.

14. The LDO circuit of claim 1, wherein the power stage has a rectangular area on a substrate in which the LDO circuit is disposed.

15. An electronic device, comprising:

an input terminal;

an output terminal;

an amplifier electrically connected to the input terminal; and a power stage having a first terminal electrically connected to the input terminal, a second terminal electrically connected to an output node of the amplifier, and a third terminal electrically connected to the output terminal, wherein the amplifier comprises a fourth switch transistor electrically connected to the third terminal of the power stage, and wherein:

the electronic device is configured to operate in a first mode when the fourth switch transistor is turned on, the electronic device is configured to operate in a second mode when the fourth switch transistor is turned off, and wherein the second mode indicates that the electronic device is disabled.

16. The electronic device of claim 15, further comprising a compensation circuit electrically connected between the fourth switch transistor and the output terminal, wherein the compensation circuit provides a zero for a frequency response of the LDO circuit.

17. The electronic device of claim 15, wherein the amplifier is a cascode operational amplifier, comprising:

a fifth transistor;

a sixth transistor having a gate electrically connected with a gate of the fifth transistor;

a seventh transistor having a drain electrically connected to the drain of the fifth transistor; and an eighth transistor having a drain electrically connected to the drain of the sixth transistor, and a gate electrically connected to a gate of the seventh transistor.

18. A method of manufacturing a low dropout (LDO) circuit, comprising:

providing a substrate;

forming a first transistor and a second transistor of a power stage in a series connection in the substrate;

wherein the first transistor has a source electrically connected to an input terminal of the LDO circuit and a gate electrically connected to an output node of a cascode operational amplifier of the LDO circuit;

wherein the second transistor has a source electrically connected to a drain of the first transistor, a gate configured to receive an adaptive bias voltage, and a drain electrically connected to an output terminal of the LDO circuit.

19. The method of claim 18, further comprising:

forming a first via stacking structure electrically connected to the first transistor of the power stage; and forming a second via stacking structure electrically connected to the second transistor of the power stage.

20. The method of claim 19, further comprising:

forming a first conductive layer electrically connecting the first via stacking structure and the input terminal of the LDO circuit; and forming a second conductive layer electrically connecting the second via stacking structure and the output terminal of the LDO circuit, wherein the second conductive layer extends in a direction perpendicular to the extending direction of the second via stacking structure.

* * * * *